(12) United States Patent
Ersek et al.

(10) Patent No.: US 7,730,475 B2
(45) Date of Patent: *Jun. 1, 2010

(54) DYNAMIC METABASE STORE

(75) Inventors: Richard A. Ersek, Woodinville, WA (US); Robert M. Craig, Bellevue, WA (US); William J. Staples, Duvall, WA (US); Mohit Srivastava, Seattle, WA (US); Varsha Jayasimha, Redmond, WA (US); Stephen L. Rakonza, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1265 days.

This patent is subject to a terminal disclaimer.

(21) Appl. No.: 11/250,774

(22) Filed: Oct. 14, 2005

(65) Prior Publication Data

US 2006/0037014 A1   Feb. 16, 2006

Related U.S. Application Data

(63) Continuation of application No. 10/185,267, filed on Jun. 27, 2002, now Pat. No. 6,990,656.

(51) Int. Cl.
*G06F 9/44* (2006.01)
(52) U.S. Cl. .................. 717/168; 717/169; 717/170; 717/113
(58) Field of Classification Search ........... 719/321; 717/168, 169, 170
See application file for complete search history.

(56) References Cited

U.S. PATENT DOCUMENTS

| | | | | |
|---|---|---|---|---|
| 5,375,232 A | * | 12/1994 | Legvold et al. | 711/162 |
| 6,003,075 A | * | 12/1999 | Arendt et al. | 709/221 |
| 6,151,605 A | * | 11/2000 | Costa | 707/101 |
| 6,173,417 B1 | * | 1/2001 | Merrill | 714/15 |
| 6,487,645 B1 | * | 11/2002 | Clark et al. | 711/162 |
| 6,675,178 B1 | * | 1/2004 | Chinchar et al. | 707/201 |
| 7,188,163 B2 | * | 3/2007 | Srinivasan et al. | 709/221 |
| 2002/0095663 A1 | * | 7/2002 | Joory | 717/136 |

* cited by examiner

*Primary Examiner*—Lewis A Bullock, Jr.
*Assistant Examiner*—Paul Mills
(74) *Attorney, Agent, or Firm*—Workman Nydegger

(57) ABSTRACT

Methods, systems, and computer program products for editing configuration data such that alterations in one representation of the configuration data are reflected in one or more other representations of the configuration data. The altered configuration data may take effect without having to restart a corresponding program module. Multiple alterations to the configuration data may be consolidated. A differencing operation may be used to identify an altered portion of the configuration data. For one or more altered portions, an "updategram" may be generated and used to update a multiple program modules at various interconnected computer systems. A history of alterations to configuration data also may be maintained, making it possible to revert to an earlier version of the configuration data. Erroneous data may be ignored. Access to updated representations of the configuration data may be provided at a configuration management interface.

19 Claims, 5 Drawing Sheets

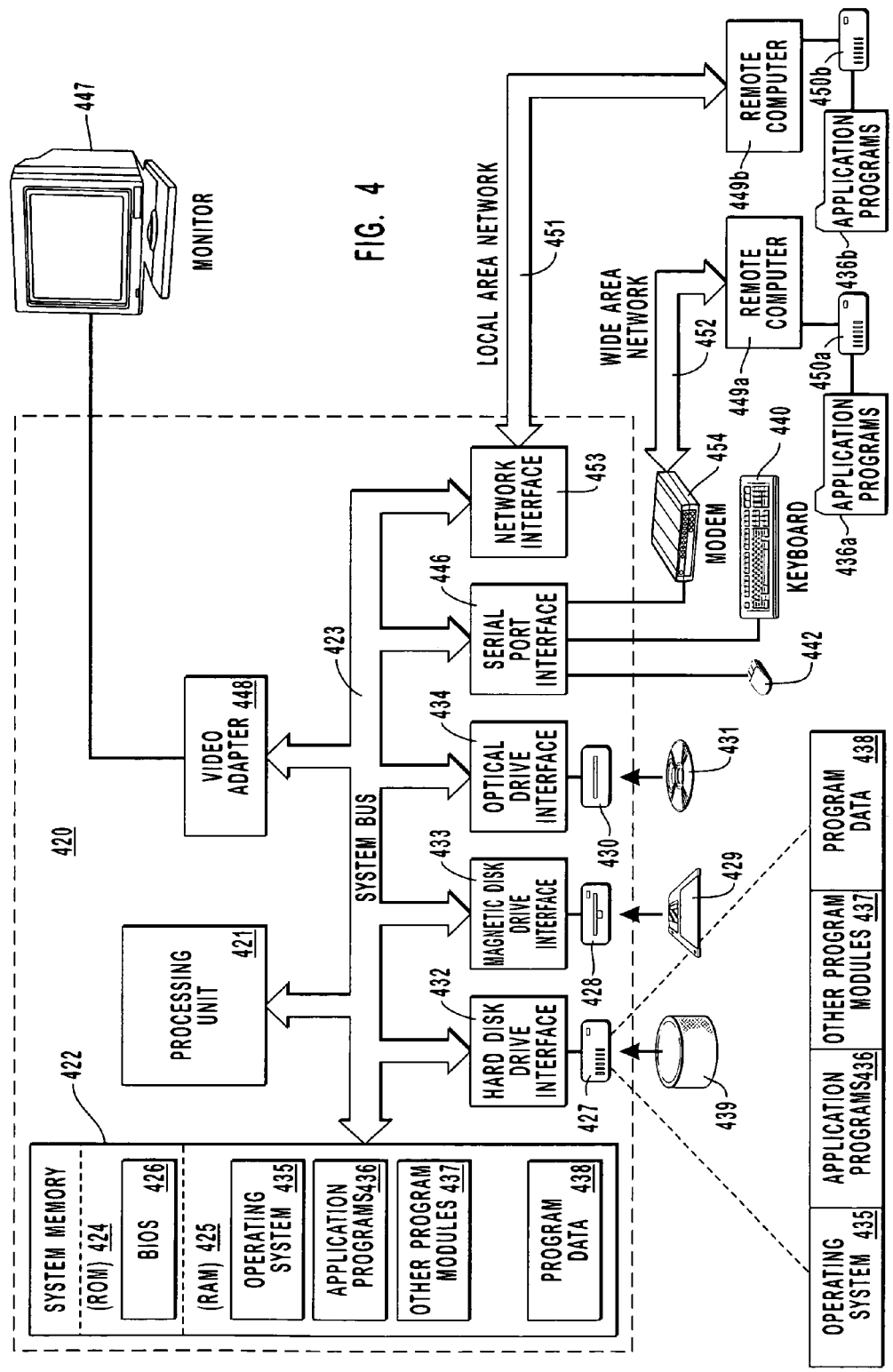

DYNAMIC METABASE STORE

CROSS-REFERENCE TO RELATED APPLICATIONS

This application is a continuation of patent application Ser. No. 10/185,267, filed Jun. 27, 2002, and entitled "DYNAMIC DATABASE STORE" and which is incorporated here by reference.

BACKGROUND OF THE INVENTION

1. The Field of the Invention

The present invention relates to the field of configuration data for program modules. Specifically, the present invention relates to methods, systems, and computer program products for editing the configuration data such that changes made to one representation of the configuration data are reflected in one or more other representations of the configuration data.

2. Background and Related Art

Most computer software tends to use configuration data in meeting the needs and preferences of various end-users and circumstances. For example, configuration data may be used to specify available hardware or resources, operating parameters, default behavior, user preferences, etc. Typically, much of this configuration data, particularly data used during software initialization, resides in persistent storage to make the data available each time the computer software is executed.

It is common for certain software to retrieve some configuration data only once, such as during initialization. Often, any changes to this configuration data do not take effect until the software is restarted. Restarting software, however, may represent a significant burden to certain applications. For example, it may be important for software that provides resources over the Internet (e.g., software that is part of an operating World Wide Web ("Web") site) to be available twenty-four hours a day.

Configuration data may be stored in any of a variety of formats or representations, including human readable text files and binary files or representations. Individual text files tend to store information for a single program or group of related programs. While some binary files also may be dedicated to specific software, others contain configuration settings for (perhaps many) unrelated programs. As a general rule, text files impose some additional processing overhead, such as parsing, etc., in providing access to the configuration data. Binary files reduce processing overhead, but require a user interface for access.

Ordinarily, configuration data is stored in either text files or in binary files, but less commonly in both. As a result, access to configuration data may be limited to either (i) tools for modifying a text file, or (ii) some user interface capable of reading and writing a binary file or representation. Under many circumstances, storing configuration data as either a text file or a binary representation may be acceptable. However, like the configuration data itself, some users or circumstances may favor one format or representation to another, making both formats, or the option to chose from either representation, an attractive feature. Accordingly, methods, systems, and computer program products for editing the configuration data such that changes made to one representation of the configuration data are reflected in one or more other representations of the configuration data are desired.

BRIEF SUMMARY OF THE INVENTION

The present invention relates to methods, systems, and computer program products for editing configuration data such that changes made to one representation of the configuration data are reflected in one or more other representations of the configuration data. When an in-memory representation of configuration data is altered, the corresponding changes are reflected in a file representation of the configuration data. Similarly, when the file representation of the configuration data is altered, the corresponding changes are reflected in the in-memory representation of the configuration data. For example, a software interface may be used to alter the in-memory representation of the configuration data and a text editor or other software may be used to alter the file representation of the configuration data. A software module may operate in accordance with the altered configuration data without having to be restarted.

Multiple alterations to the configuration data may be consolidated. For example, an update time period may be defined such that multiple alterations to the in-memory representation of the configuration data that occur within the update time period are reflected in the file representation of the configuration data as a single alteration. Reflecting alterations in the file representation may be deferred, perhaps based on the number of alterations made during a given time period. However, a maximum number of deferrals may be reached eventually, so that the alterations are reflected in the file representation without being deferred further.

A differencing operation may be used to identify the altered portion of the file representation of configuration data. This differencing operation may reduce the processing required to reflect changes to the file representation in the in-memory representation. An "updategram" of altered portions of configuration data may be generated and used to update multiple program modules at various interconnected computer systems. A history of alterations to configuration data also may be maintained. With the history, it may be possible to revert to an earlier version of the configuration data if erroneous data is encountered and an earlier version is available. It also may be possible to recover from certain error conditions by ignoring the erroneous data. Access to updated representations of the configuration data may be provided at a configuration management interface.

Additional features and advantages of the invention will be set forth in the description which follows, and in part will be obvious from the description, or may be learned by practicing the invention. The features and advantages of the invention may be realized and obtained by means of the instruments and combinations particularly pointed out in the appended claims. These and other features of the present invention will become more fully apparent from the following description and appended claims, or may be learned by practicing the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 4 illustrates an example system that provides a suitable operating environment for the present invention.

DETAILED DESCRIPTION OF THE PREFERRED EMBODIMENTS

Figure 1:
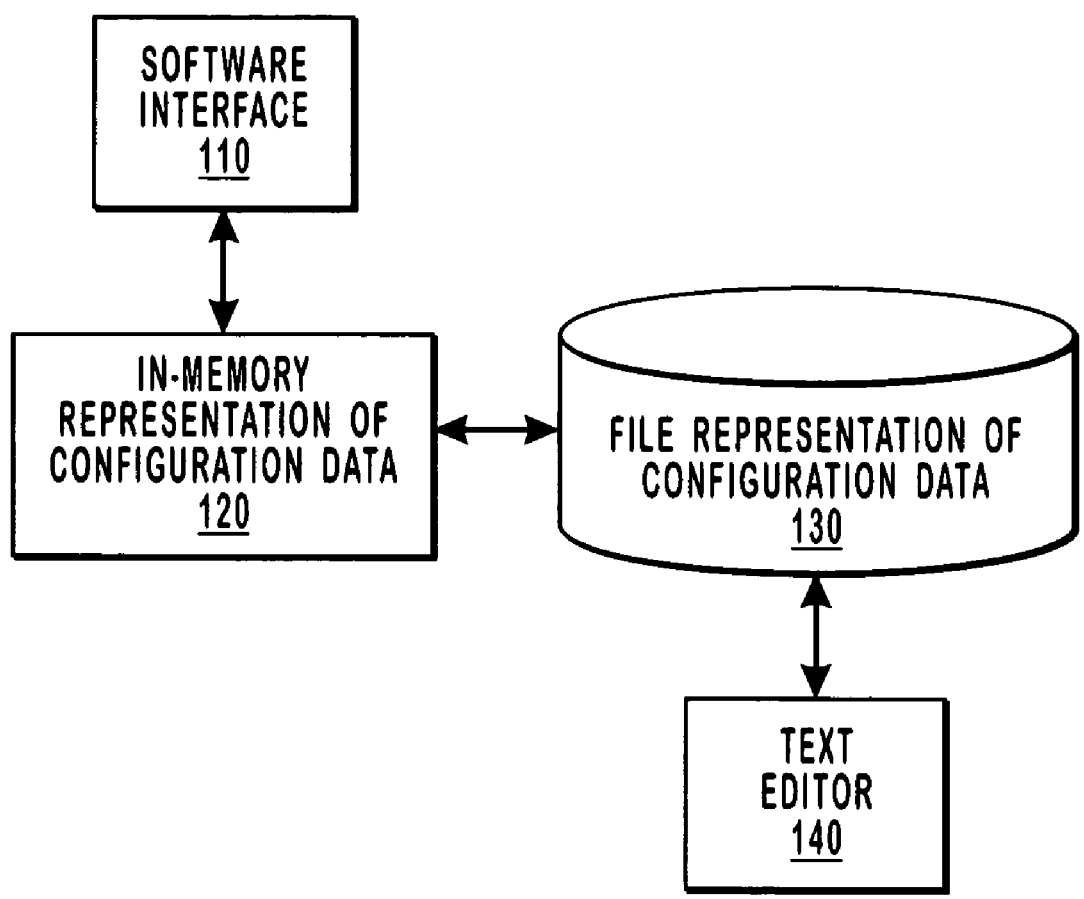
FIG. 1 illustrates a high-level block diagram for reflecting changes made to one representation of configuration data in another representation of configuration data.

The present invention relates to methods, systems, and computer program products for setting or changing configuration data such that changes made to one representation of the configuration data are reflected in one or more other representations of the configuration data. FIG. 1 illustrates a high-level block diagram for reflecting changes made to an in-memory representation 120 of configuration data in a file representation 130 of configuration data, and vice versa. Software interface 110 provides access to the in-memory representation 120 and text editor 140 (or other software including a software interface) provides access to the file representation 130. In some embodiments, software interface 110 includes multiple software levels, such as a high-level software interface and a low-level software interface (see, e.g., software interface 210 in FIG. 2). By reflecting changes made to one representation of the configuration data in one or more other representations of the configuration data, each of the representations is kept current and may be used to manage the operation of one or more program modules, based on whichever representation a particular user or circumstance prefers. The configuration data or portions thereof may be exported to a configuration file to be imported by either the same or another computer system.

Figure 2:
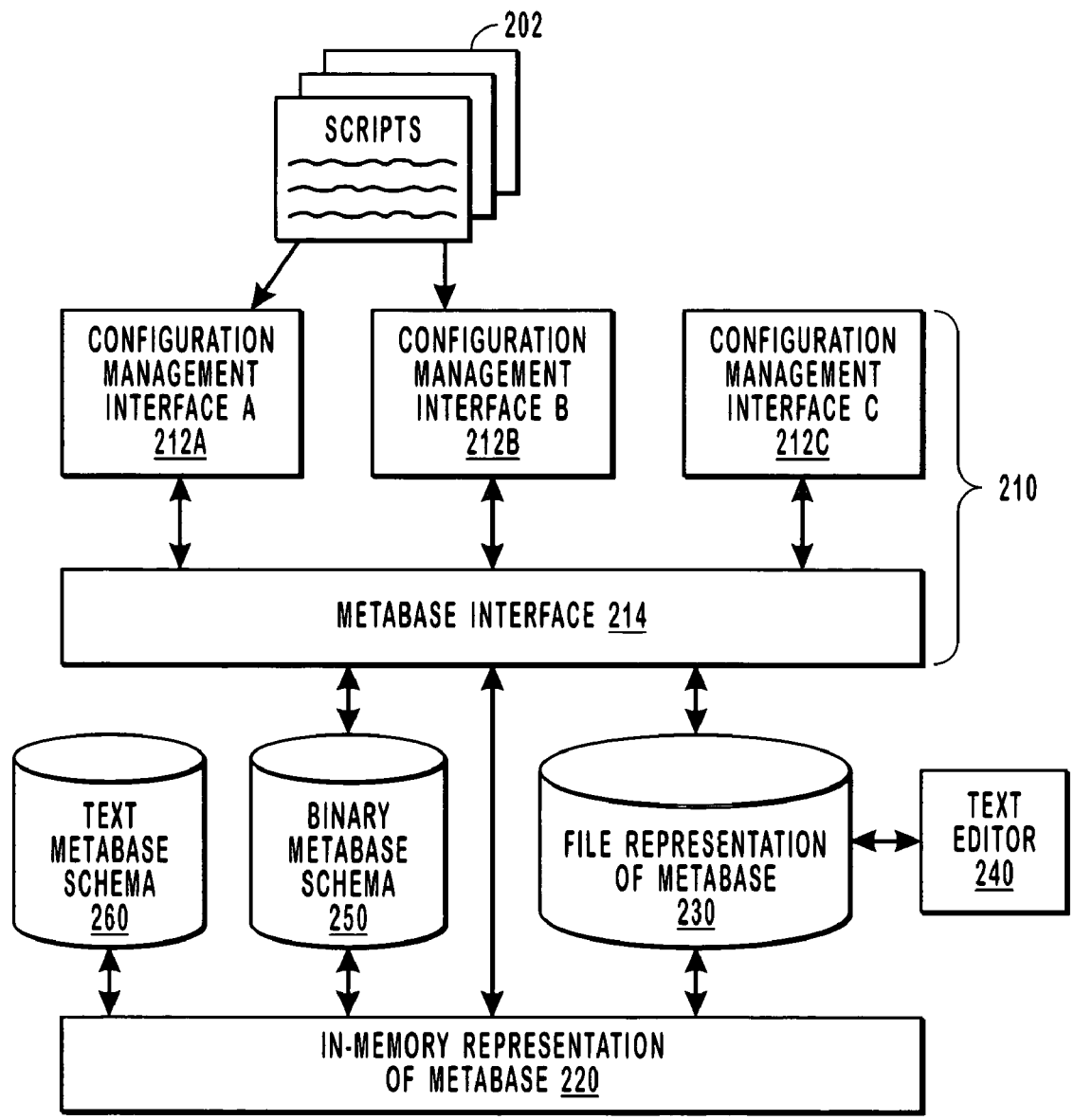
FIG. 2 is a block diagram for an example system that alters representations of a metabase in accordance with the present invention.

FIG. 2 is a block diagram for an example system that alters representations of a metabase in accordance with the present invention. Certain processing aspects of the example system shown in FIG. 2 will be described in further detail below with respect to the example methods illustrated in FIGS. 3A and 3B. Both a file representation 230 and an in-memory representation 220 of the metabase are present. The metabase is structured in accordance with an extensible Markup Language ("XML") schema. Through tags or markups that define data elements and attributes, XML provides significant flexibility in both describing data relationships and exchanging data between computer systems. To define data relationships, XML tags may be arranged in a hierarchical schema with an indicator for the number of data elements of a particular type to expect at various levels within the schema. For example, it is common for a schema to dictate that at a particular level, a given data element is expected exactly once, zero or once, zero or more times, etc.

The term "metabase" is used with respect to FIG. 2 because it stores data about another form of data (e.g., configuration setting that describe attributes of other data and logical system elements, including web sites, web content, service behavior, etc.). Databases tend to store collections of similar information, such as name, address, and telephone number entries for a telephone book, whereas configuration data tends to be a collection of unrelated data, with single or few occurrences of a particular data object being common to multiple entries (e.g., which port corresponds to a particular communication protocol, how much memory to use for a particular operation, etc.). Nevertheless, as used in this application, the term "metabase" should be interpreted broadly to encompass any technology suitable for storing configuration data, including databases.

Text editor 240 is used to alter the file representation 230 of the metabase. Software interface 210 is used to alter the in-memory 220 representation of the metabase. Software interface 210 does not directly change the file representation 230 of the metabase. Rather, the software interface 210 changes the in-memory 220 representation of the metabase, and, when the in-memory 220 representation is saved to disk, file representation 230 changes. Software interface 210 can, however, trigger the save to disk. Binary metabase schema 250 (described in more detail below) and text metabase schema 260, which is a text version of binary metabase schema 250, are altered in a similar fashion.

In some embodiments, metabase interface 214 (and more generally software interface 210) is also capable of changing the file representation 230 of the metabase, the in-memory representation 220 of the metabase, the text metabase schema 260A, and the binary metabase schema 250. For example, configuration management interface A 212A and metabase interface 214 may be used to alter text metabase schema 260 and binary metabase schema 250. (In some embodiments, configuration management interfaces, such as configuration management interface A 212A, may bypass metabase interface 214 and access binary metabase schema 250 directly.) Binary metabase schema 250 contains a binary representation of the XML schema that describes the structure of the metabase. Keeping a binary representation of the XML schema allows for faster processing because the text version does not need to be parsed for each schema access. The in-memory representation 220 of the metabase includes a binary representation of the metabase schema.

Note that for the example system illustrated in FIG. 2, software interface 210 includes metabase interface 214 and configuration management interfaces A 212A, B 212B, and C 212C. Configuration management interface A 212A and configuration management interface B 212B support changes to the metabase through scripts 202. Two common examples of a configuration management interface are implementations of the Distributed Management Task Force's Configuration Information Management ("CIM") Specification and the Microsoft® Active Directory Service Interfaces ("ADSI"). Of course, many other configuration management interfaces are possible, and the present invention is not necessarily limited to any particular implementation.

CIM itself is conceptual and not bound to a particular implementation. It allows for exchanging management information between management systems and applications. CIM includes (i) a specification that describes the language, naming, schema and mapping techniques to other management models, and (ii) a schema that supplies classes with properties and associations useful in organizing information related to the managed environment. Microsoft® Windows Management Instrumentation ("WMI") is one implementation of CIM. The primary mechanism for specifying CIM schema is through the Managed Object Format ("MOF"). A MOF compiler parses MOF files and adds the defined classes and instances to a CIM repository for access. Generating a new MOF file and submitting it to the MOF compiler is one way in which schema changes to the metabase are made accessible to a configuration management interface.

ADSI is an object-oriented COM (Component Object Model) interface for accessing configuration stores. It was initially developed as an interface to the Microsoft Active Directory database although the interface design is deliberately generalized to enable its use with configuration stores other than Active Directory. In this specific embodiment, it is used as an interface to the Metabase. ADSI provides a single and consistent interface for managing multiple directories to query, identify and locate resources, such as users, groups, print queues, and documents. The hierarchical and object-based nature of directories makes ADSI suitable for metadata described by a hierarchical schema using XML.

ADSI defines classes of elements including containers, objects and attributes about objects. In a specific instance of a configuration store, each element in the store corresponds to one of the ADSI object types. In this definition of objects, ADSI uses one particular container instance to store the schema of the directory or database store. In turn, the schema describes the expected elements and attributes of each container type and the expected attributes of each non-container object type. ADSI is well suited to describing the characteristics of the metabase because the schema can define a hierarchy of containment in which one container may be defined in the schema as containing one or more other containers. The containment hierarchy is used to model attributes of the metabase such as child nodes (or containers) inheriting attributes from parent nodes (containers). Using ADSI it is possible to query or browse and extend the definitions (schema) of objects for a particular namespace. Accordingly, an ADSI configuration management interface in connection with metabase interface 214 can be used to access the metabase.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 3A:
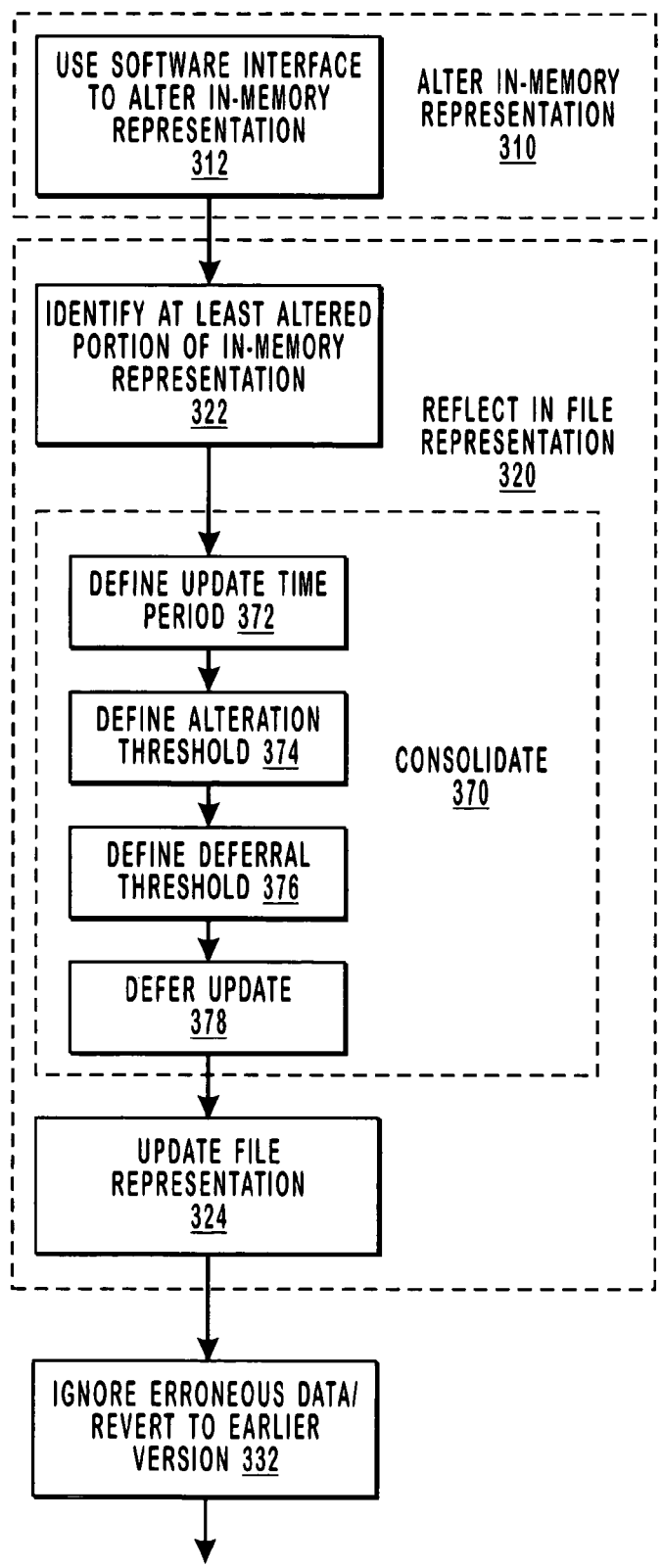
FIGS. 3A and 3B show example acts and steps for methods of altering configuration data in accordance with the present invention.
Figure 3B:
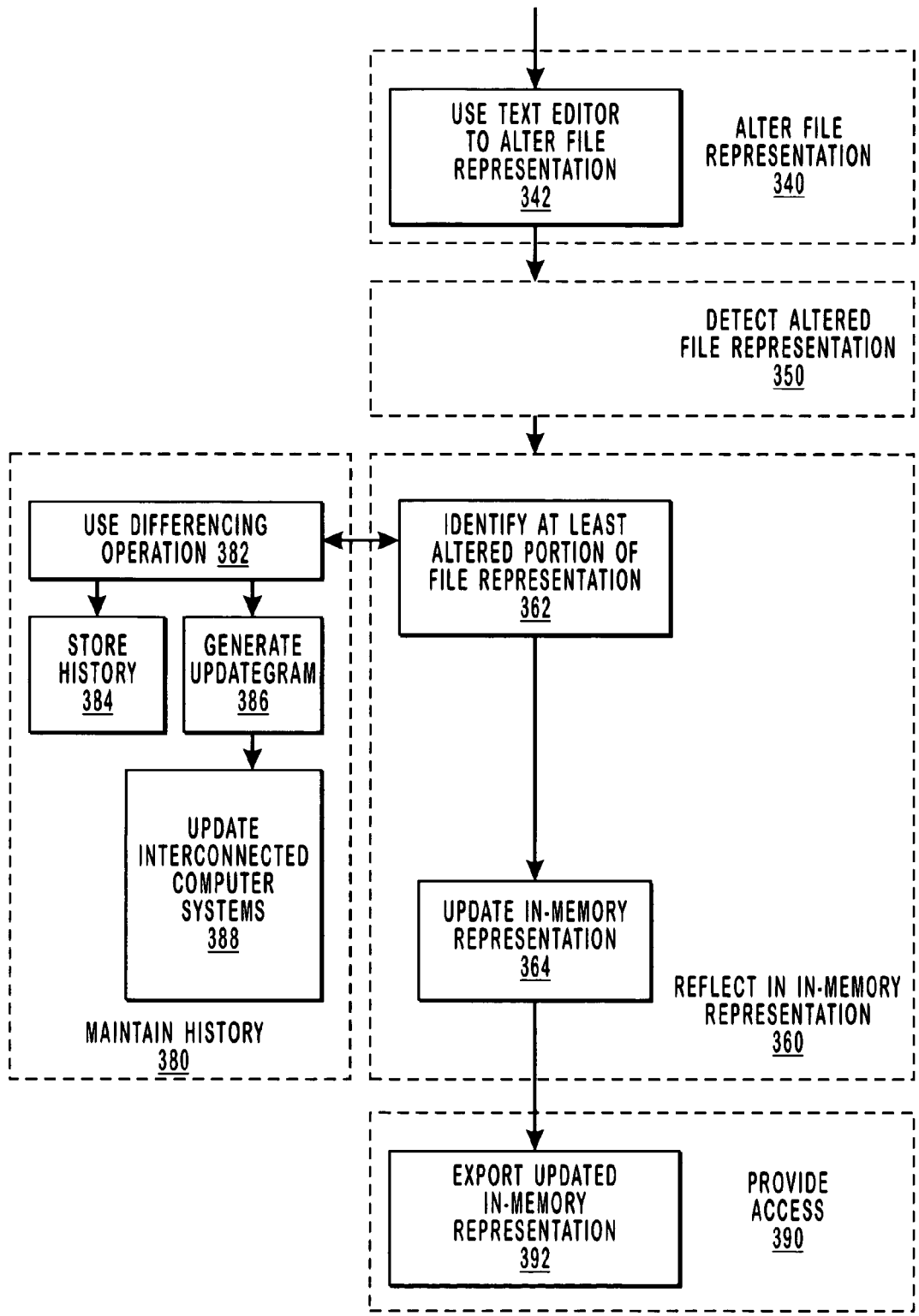

FIGS. 3A and 3B show example acts and steps for methods of altering configuration data in accordance with the present invention. A step for altering (310) an in-memory representation of configuration data may include an act of using (312) a software interface to alter the in-memory representation. A step for reflecting (320) at least the altered portion of the in-memory representation of the configuration data in the file representation may include acts of identifying (322) at least an altered portion of the in-memory representation and updating (324) the file representation to reflect at least the altered portion of the in-memory representation. For example, changes to the in-memory representation are reflected in the file representation when the in-memory representation is saved to disk. Alternatively, the entire in-memory representation of the configuration data or a portion of the in-memory representation that includes altered and unaltered configuration data may be reflected in the file representation.

A step for reflecting (320) at least the altered portion of the in-memory representation of the configuration data in the file representation also may include a step for consolidating (370) two or more alterations to the in-memory representation of the configuration data, which in turn, may include acts of: defining (372) an update time period, defining (374) an alteration threshold, defining (376) a deferral threshold, and deferring (378) update of the file representation of the configuration data, for example, until expiration of the update time period. When the number of alterations within an update time period reaches the alteration threshold, updating the file representation of the configuration data is deferred for another update time period. However, when the number of consecutive deferrals reaches the deferral threshold, updating the file representation of the configuration data cannot be deferred for another update time period.

This reduces the number of write operations on the file representation while assuring that changes are regularly persisted. Consider, for example, that the update time period is sixty seconds, the alteration threshold is thirty, and the deferral threshold is five. All alterations occurring within the sixty seconds of the update time period will be consolidated to update the file representation one time only. However, if the number of alterations is at least thirty, the alteration threshold, the update will be deferred for another update time period of sixty seconds, with all updates that occur during the second update time period being consolidated into the single update. If the number of alterations during the next update time period is less than thirty, the file representation is updated. If the number of alterations during the next update time period is at least thirty, the update will be deferred for another update time period, and so on. An update can be deferred a maximum of five times, the deferral threshold, after which the update can no longer be deferred. Of course, the update time period, alteration threshold, and deferral threshold are logical limits and should be interpreted broadly to encompasses a variety of mathematical operations, including when a number is reached, when a number is exceeded, when a certain percentage of a number is reached or exceeded, etc.

To the extent that altering the in-memory representation of the configuration data involves schema changes, the schema changes may be reflected in text and/or binary versions of the schema. It is possible for the configuration data to be altered such that it contains erroneous data, such as data that is not schema-valid or data that is schema-valid, but is nevertheless erroneous (perhaps because the data is outside of an allowable range or violates some other criteria, and so on). In order to allow a program module to begin or continue executing, the present invention may include an act (332) of ignoring erroneous data or reverting to an earlier version of the configuration data, if an earlier version is available. For example, a user may be presented with an option to retrieve an earlier version of the configuration data for a particular program module or an earlier version may be retrieved automatically. In one embodiment, if erroneous edits are made to the configuration data, such as a user making erroneous edit to the configuration data via a text editor, the erroneous file is stored as an error file. Versions of configuration data are described in more detail below with respect to maintaining a history of the configuration data.

If a data element is written through a software interface to the in-memory representation and is not schema-valid but is otherwise well-formed data, it is possible to write the data element to the file representation by writing the data attributes which would normally be defined in the schema along with the specific values of the data element's descriptive attributes (metadata). In the XML representation of the metabase, the data element is written as a custom element tag and the descriptive attributes (metadata) of that element are written as XML tags and attributes contained within the custom tag. The elements contained within the custom element tag replace the specifications of data attributes that would otherwise be found in the schema.

A step for altering (340) a file representation of the configuration data may include an act of using (342) a text editor to alter the file representation. Similar to the in-memory representation, the file representation also may be altered by a software interface. A step for detecting (350) at least an altered portion of the file representation may include detecting that the file representation has been altered. For example, an operating system may provide a notification when a particular file has been modified. Alternatively, a software interface or tool for altering the file representation may indicate when the file representation is altered.

A step for reflecting (360) at least the altered portion of the file representation of configuration data in the in-memory representation may include acts of identifying (362) at least an altered portion of the file representation and updating (364) the in-memory representation to reflect at least the altered portion of the file representation. The step for reflecting (360) at least the altered portion of the file representation of configuration data in the in-memory representation also may include acts of using (382) a differencing operation to identify only the altered portion of the file representation and updating (364) the in-memory representation of the configuration data with only the altered portion of the file representation. A step for maintaining (380) a history of alterations to the file representation may include and act of storing (384) one or more altered portions of the file representation of the configuration data, such as one or more altered portions that are identified in one or more differencing operations. A step for maintaining (380) a history of alterations to the file representation also may include acts of: generating (386) an updategram of one or more altered portions of the file representation that are identified in one or more differencing operations and updating (388) the in-memory representation of configuration data for a plurality of program modules at one or more interconnected computer systems. A step for providing (390) access to one or more updated in-memory representations of the configuration data at a configuration management interface may include an act of exporting (392) an updated in-memory representation of the configuration data to the configuration management interface. For example, the updated in-memory representation may be accessed through a configuration management interface.

FIG. 4 illustrates an example system that provides a suitable operating environment for practicing the present invention. The embodiments of the present invention may comprise one or more special purpose and/or one or more general purpose computers including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system executing one or more program modules that operate in accordance with configuration data, wherein the configuration data is used during initialization of the one or more program modules, the computing system comprising:
one or more computer-readable storage media having computer-executable instructions for implementing a method of editing the configuration data such that changes made to one representation of the configuration data are reflected in one or more other representations of the configuration data, thereby keeping each of multiple representations of the configuration data current, the method comprising:
defining an update time period during which any alterations made to a non-persistent in-memory representation of the configuration data are deferred from being propagated to a persistent file representation of the configuration data;
receiving multiple alterations to the non-persistent in-memory representation of the configuration data during the update time period;
after the update time period has elapsed, comparing the number of alterations that were made to the non-persistent in-memory representation of the configuration data during the update time period to an alteration threshold;
upon determining that the number of alterations is less than the alteration threshold, updating the persistent file representation of the configuration data to reflect all the alterations that were made to the non-persistent in-memory representation of the configuration data during the update time period; and
upon determining that the number of alterations is more than the threshold, deferring the updating of the persistent file representation of the configuration data for at least an additional update time period.

2. A computing system as recited in claim 1, wherein the one or more program modules operate in accordance with the altered in-memory representation of the configuration data without having to be restarted.

3. A computing system as recited in claim 1, wherein a software interface is used to make multiple alterations to the in-memory representation of the configuration data at distinct times.

4. A computing system as recited in claim 3, wherein the method further comprises an act of defining a deferral threshold, such that when the number of consecutive deferrals reaches the deferral threshold, updating the file representation of the configuration data cannot be deferred for another update time period.

5. A computing system as recited in claim 1, wherein the method further comprises:
using a differencing operation to identify an altered portion of the file representation of the configuration data; and
updating the in-memory representation of the configuration data with only the altered portion of the file representation of the configuration file that is identified by the differencing operation.

6. A computing system as recited in claim 5, wherein the method further comprises an act of storing one or more altered portions of the file representation of the configuration data that are identified in one or more differencing operations as a history of alterations to the file representation of the configuration data.

7. A computing system as recited in claim 6, wherein a later altered portion of the file representation of the configuration data, corresponding to a later differencing operation, contains erroneous configuration data, and wherein the method further comprises an act of ignoring the later altered portion.

8. A computing system as recited in claim 1, wherein at least one of the in-memory representation of the configuration data and the file representation of the configuration data is structured in accordance with an eXtensible Markup Language ("XML") schema.

9. A computing system as recited in claim 5, wherein the file representation is altered via at least one of a text editor or a software interface.

10. A computing system as recited in claim 1, wherein the method further comprises an act of exporting the updated in-memory representation of the configuration data to a configuration management interface.

11. A computing system as recited in claim 1, wherein the method further comprises an act of exporting either the file representation or in-memory representation of the configuration data for subsequent importing by some computer system.

12. A computing system executing one or more program modules that operate in accordance with configuration data, the computing system comprising:
one or more computer-readable storage media having computer-executable instructions for implementing a method of editing the configuration data such that changes made to one representation of the configuration data are reflected in one or more other representations of the configuration data, thereby keeping each of multiple representations of the configuration data current, the method comprising:
altering an in-memory representation of the configuration data, wherein altering the in-memory representation includes making multiple alterations at distinct times during an update time period;
after the update time period has elapsed, determining a total number of alterations that includes the number of alterations that were made to the in-memory representation during the update time period and the number of alterations that were made during a previous update time period that were deferred from being propagated to a persistent file representation of the configuration data;
comparing the total number of alterations to an alteration threshold;
upon determining that the total number of alterations is less than the alteration threshold, updating the persistent file representation of the configuration data to reflect all the alterations that were made to the non-persistent in-memory representation of the configuration data during the update time period; and
upon determining that the total number of alterations is more than the threshold, determining the maximum number of update time periods that at least some of the alterations have been deferred such that if at least some of the alterations have been deferred for a number of update time periods that exceeds a deferment threshold, the persistent file representation of the configuration data is updated to reflect all the alterations, whereas if none of the alterations have been deferred for a number of update time periods that exceeds the deferment threshold, the update of the persistent file representation with the alterations is deferred for at least an additional update time period.

13. A computing system as recited in claim 12, wherein the one or more program modules operate in accordance with the altered in-memory representation of the configuration data without having to be restarted.

14. A computing system as recited in claim 12, wherein the software interface is used to make multiple alterations to the in-memory representation of the configuration data at distinct times, and wherein the method further comprises a step for consolidating two or more alterations to the in-memory representation of the configuration data that occur during an update time period into a single update of the file representation of the configuration data.

15. A computing system as recited in claim 12, wherein the method further comprises a step for maintaining a history of alterations to the file representation of the configuration data.

16. A computing system as recited in claim 15, wherein the history of alterations defines one or more versions of the file representation of the configuration data, and wherein the file representation of the configuration data contains erroneous data, and wherein the method further comprises an act of: (i) ignoring the erroneous data, or (ii) reverting to an earlier version of the file representation of the configuration data if one exists.

17. A computing system as recited in claim 12, wherein at least one of the in-memory representation of the configuration data and the file representation of the configuration data is structured in accordance with an eXtensible Markup Language ("XML") schema, and wherein the XML schema allows for custom configuration data for one or more data elements at one or more specific locations within the configuration data that are not otherwise represented in the XML schema.

18. A computing system as recited in claim 12, wherein the method further comprises a step for providing access to one or more updated in-memory representations of the configuration data at a configuration management interface.

19. A computing system as recited in claim 3, wherein the software interface is a object-oriented Component Object model interface.

* * * * *